United States Patent
Tian

(10) Patent No.: US 11,039,168 B2
(45) Date of Patent: Jun. 15, 2021

(54) STEREOSCOPIC IMAGE DATA COMPRESSION

(71) Applicant: DISPLAYLINK (UK) LIMITED, Cambridge (GB)

(72) Inventor: Shumin Tian, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/762,117

(22) PCT Filed: Oct. 26, 2018

(86) PCT No.: PCT/GB2018/053112
§ 371 (c)(1),
(2) Date: May 6, 2020

(87) PCT Pub. No.: WO2019/092398
PCT Pub. Date: May 16, 2019

(65) Prior Publication Data
US 2020/0359052 A1 Nov. 12, 2020

(30) Foreign Application Priority Data
Nov. 8, 2017 (GB) ...................... 1718455

(51) Int. Cl.
*H04N 19/597* (2014.01)
*H04N 19/463* (2014.01)
(Continued)

(52) U.S. Cl.
CPC ......... *H04N 19/597* (2014.11); *H04N 13/111* (2018.05); *H04N 13/128* (2018.05); *H04N 13/194* (2018.05); *H04N 19/463* (2014.11)

(58) Field of Classification Search
None
See application file for complete search history.

(56) References Cited

U.S. PATENT DOCUMENTS

2006/0133493 A1 6/2006 Cho et al.
2013/0342644 A1 12/2013 Rusanovskyy et al.

FOREIGN PATENT DOCUMENTS

WO WO 2010/011557 1/2010
WO WO 2012/149084 11/2012

OTHER PUBLICATIONS

Lemmens, Mathias J.P.M., "A Survey on Stereo Matching Techniques", Congress Proceedings, Jan. 1, 1988, [retrieved Nov. 30, 2016], Retrieved from the Internet <URL: http://www.isprs.org/proceedings/xxvii/congress/part5/11_xxvii-part5-sup.pdf>.

*Primary Examiner* — Christopher Braniff
(74) *Attorney, Agent, or Firm* — Haynes and Boone, LLP

(57) ABSTRACT

A method for compressing data comprising a stereoscopic pair of images which provide parallax, when viewed by left and right eyes of an observer, involves generating (S31) the stereoscopic pair of images, each image comprising a plurality of display elements. A disparity value (S32) is generated indicating an amount by which a location of each display element in a first image of the stereoscopic pair of images is displaced compared to a displaced location of the same display element in a second image of the stereoscopic pair of images, such that a plurality of disparity values is generated. The number of different disparity values present in the plurality of disparity values is then reduced (S34) to produce a reduced set of different disparity values. A particular disparity value is determined from the reduced set of different disparity values to be associated with each of the locations and/or displaced locations of the display elements, and compressed data (S35) is generated comprising the first image of the stereoscopic pair of images, the reduced set of different disparity values, and information indicating the particular disparity value associated with each of the locations and/or displaced locations to be used to regenerate a (Continued)

regenerated second image of the stereoscopic pair of images corresponding to the second image.

31 Claims, 12 Drawing Sheets

(51) Int. Cl.
  *H04N 13/128* (2018.01)
  *H04N 13/194* (2018.01)
  *H04N 13/111* (2018.01)

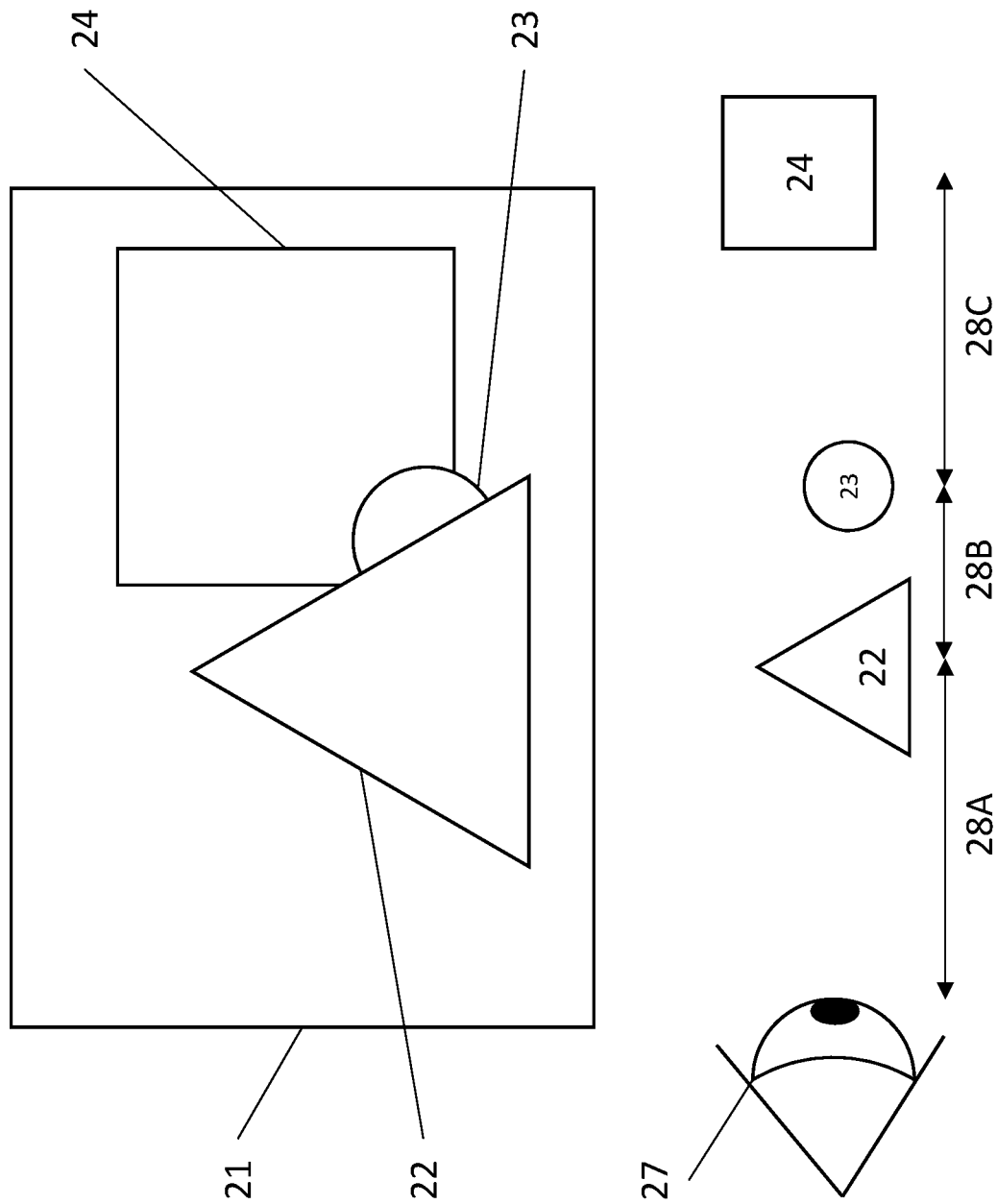

| 46 | 10 | 11 | 00 | 10 | 10 | 00 | 11 | 01 | 10 | 01 | 00 | 10 |
|----|----|----|----|----|----|----|----|----|----|----|----|----|
|    | 2  | 3  | 0  | 2  | 2  | 0  | 3  | 1  | 2  | 1  | 0  | 2  |

÷4

| 48 | 1011 | 1101 | 0011 | 1010 | 1000 | 0000 | 1111 | 0101 | 1011 | 0111 | 0010 | 1001 |
|----|------|------|------|------|------|------|------|------|------|------|------|------|
|    | 11   | 13   | 3    | 10   | 8    | 0    | 15   | 5    | 11   | 7    | 2    | 9    |

Figure 4d

STEREOSCOPIC IMAGE DATA COMPRESSION

CROSS-REFERENCE TO RELATED APPLICATIONS

This application is a U.S. national stage application under 35 U.S.C. § 371 of International Patent Application No. PCT/GB2018/053112, filed on Oct. 26, 2018, which claims the benefit of Great Britain Patent Application No. 1718455.7 filed on Nov. 8, 2017, the contents of each of which are incorporated herein by reference in their entirety.

BACKGROUND

This invention relates, generally, to compression of data that forms a stereoscopic pair of images, which, when provided to left and right eyes of a viewer, appear to that viewer as a single 3D image. In three-dimensional video encoding, multiple angles on the same scene are provided or generated by multiple actual or virtual cameras. Since all the cameras are looking at the same scene, and are likely to be viewing similar angles of that same scene, there is significant redundancy between the images captured by the different cameras.

It is possible to take advantage of the redundancy between the images generated from different angles of a single scene to reduce the volume of data transmitted. This is done by transmitting one image and disparity vectors required to recreate the other image or images. A disparity vector is a vector representing a displacement of a location of an element between one of the pair of images and the other, which provides the parallax to provide the 3D effect when observed. It is distinct from a motion vector as there is no movement through time, only between two angles on the same scene at the same time. It will be appreciated that although the disparity vector does have, strictly, a direction as well as a displacement value, since the direction will be on or parallel to an axis from a point on one of the pair of images to a corresponding point on the other of the pair of images, corresponding to the (horizontal) direction between the left and right eyes of the observer, the direction may be provided simply by having the displacement value being provided with a positive or negative sign, since the direction will always be on or parallel to the same axis. Therefore, the terms disparity value and disparity vector will be used interchangeably hereafter.

Currently, there are two methods of using disparity vectors. The first method is to use a single global disparity vector which is associated with an entire image. This results in significant inaccuracy. The second method is to divide an image into tiles and associate a different disparity vector with each tile. However, this can result in so much overhead that the method can be rendered almost worthless.

The present invention therefore aims to solve or at least mitigate these problems.

SUMMARY

Accordingly, in a first aspect, the invention provides a method for compressing data comprising a stereoscopic pair of images which provide parallax, when viewed by left and right eyes of an observer, so as to appear to the observer as a single 3D image, the method comprising:
  generating the stereoscopic pair of images, each image comprising a plurality of display elements, wherein each display element comprises a plurality of pixels;
  generating a disparity value indicating an amount by which a location of each display element in a first image of the stereoscopic pair of images is displaced compared to a displaced location of the same display element in a second image of the stereoscopic pair of images, whereby a plurality of disparity values is generated;
  reducing a number of different disparity values present in the plurality of disparity values to produce a reduced set of different disparity values;
  determining a particular disparity value from the reduced set of different disparity values to be associated with each of the locations and/or displaced locations of the display elements;
  generating compressed data comprising the first image of the stereoscopic pair of images, the reduced set of different disparity values, and information indicating the particular disparity value associated with each of the locations and/or displaced locations to be used to regenerate a regenerated second image of the stereoscopic pair of images corresponding to the second image.

The method preferably comprises:
  obtaining depth information for each of the pixels in a display element;
  generating a disparity value for each pixel based on the depth information; and
  using the disparity values for the pixels to generate a disparity value for the display element.

The disparity value for the display element is preferably generated by using the most frequent of the disparity values for the pixels in the display element.

In one embodiment, generating the disparity values comprises comparing the first image of the stereoscopic pair of images with the second image of the stereoscopic pair of images to determine the amount by which a location of each display element in the first image is displaced compared to a displaced location of the same display element in the second image. Preferably, generating a disparity value comprises correlating patterns of pixels in each display element in the first image with patterns of pixels in the second image to determine a displacement of a matching pattern of pixels.

Generating a disparity value preferably comprises:
  calculating a correlation value for each of a plurality of patterns of pixels in each display elements in the first image with patterns of pixels in the second image;
  determining a best matching pattern of pixels as the matching pattern of pixels with the highest correlation value; and
  using the amount by which a location of the best matching pattern in the first image is displaced compared to a displaced location of the same best matching pattern in the second image to generate the disparity value for the display element.

In one embodiment, generating a disparity value comprises:
  determining a feature of interest in a display element at a location in the first image;
  determining a displaced location of the feature of interest in the second image to determine a displacement of the feature of interest and generating a disparity value for the feature of interest from the displacement; and
  generating the disparity value for the display element from the disparity value for the feature of interest. Preferably, a disparity value is generated for each of a plurality of features of interest in a display element, and disparity values are determined for other pixels in the display element by interpolating/extrapolating from the disparity values for the plurality of features of interest based on locations of the other pixels relative to the features of interest, wherein the disparity value for the display element is generated from the disparity values for the features of interest and the other pixels in the display element.

According to one preferred embodiment, reducing the number of different disparity values present in the plurality of disparity values to produce a reduced set of different disparity values comprises:
  determining different disparity values in the plurality of disparity values;
  determining a frequency of occurrence of each of the different disparity values in the plurality of disparity values, and
  including in the reduced set of different disparity values a number, but not all, of the most frequently occurring different disparity values.

According to another preferred embodiment, reducing the number of different disparity values present in the plurality of disparity values to produce a reduced set of different disparity values comprises:
  determining different disparity values in the plurality of disparity values;
  determining a frequency of occurrence of each of the different disparity values in the plurality of disparity values, and
  including in the reduced set of different disparity values a number, but not all, of the different disparity values occurring at spaced apart frequencies.

Preferably, the spaced apart frequencies are spaced more closely at higher frequencies that at lower frequencies of occurrence of the different disparity values.

According to a further preferred embodiment, reducing the number of different disparity values present in the plurality of disparity values to produce a reduced set of different disparity values comprises:
  determining different disparity values in the plurality of disparity values;
  quantising each of the different disparity values by an amount sufficient to reduce the number of different disparity values; and
  including in the reduced set of different disparity values the quantised different disparity values.

According to a still further preferred embodiment, reducing the number of different disparity values present in the plurality of disparity values to produce a reduced set of different disparity values comprises:
  predetermining different disparity values based on knowledge of numbers of different disparity values used in historical reduced sets of different disparity values; and
  including in the reduced set of different disparity values the predetermined different disparity values.

According to another preferred embodiment, reducing the number of different disparity values present in the plurality of disparity values to produce a reduced set of different disparity values comprises:
  predetermining different disparity values based on historical pluralities of disparity values from preceding stereoscopic pairs of images, the predetermined different disparity values being less than an average number of different disparity values in the historical pluralities of disparity values; and
  including in the reduced set of different disparity values the predetermined different disparity values.

Preferably, the display elements are tiles into which each of the stereoscopic pair of images are divided.

In an embodiment, the information indicating the particular disparity value that is associated with each of the locations and/or displaced locations to regenerate the regenerated second image of the stereoscopic pair of images comprises a reference to the particular disparity value in the reduced set of different disparity values.

Preferably, the compressed data further comprises correction information, may comprise a correction to the particular disparity value associated with a particular one of the locations and/or displaced locations, and/or may comprise correction information for regenerating the regenerated second image of the stereoscopic pair of images if particular disparity values associated with two or more particular locations and/or displaced locations result in the display elements at those particular locations in the regenerated second image overlapping or having gaps therebetween.

The method preferably further comprises transmitting the compressed data to a display control device and may further comprises:
  receiving, at the display control device, the transmitted compressed data; and
  regenerating the stereoscopic pair of images from the received compressed data In one embodiment, regenerating the stereoscopic pair of images from the received compressed data comprises:
  regenerating a regenerated first image of the regenerated stereoscopic pair of images corresponding to the first image using the first image of the stereoscopic pair of images from the compressed data;
  regenerating the regenerated second image of the regenerated stereoscopic pair of images corresponding to the second image using the first image of the stereoscopic pair of images from the compressed data, the reduced set of different disparity values, and the information indicating particular disparity values associated with each of the locations and/or displaced locations.

Each disparity value may be associated with a location in the first image and regenerating the regenerated second image comprises:
  based on the location of each display element in the first image, determining a corresponding location of a corresponding display element in the regenerated first image; and
  copying each of the corresponding display elements of the regenerated first image into a displaced location in the regenerated second image based on the particular disparity value associated with the location in the first image.

Each disparity value may be associated with a displaced location in the second image and regenerating the regenerated second image comprises:
  for each displaced location in the regenerated second image, determining a location in the regenerated first image based on the disparity value associated with the displaced location in the second image; and
  copying a portion of the regenerated first image at the location in the regenerated first image into the displaced location in the regenerated second image, the portion corresponding to a display element.

According to a second aspect, the invention provides a host device configured to perform all steps of a method as described above.

According to a third aspect, the invention provides a system comprising the host device mentioned above, a display control device and a pair of display panels for displaying the pair of stereoscopic images. Preferably, the display control device and the pair of display panels are incorporated in a wearable headset, which may comprise a virtual reality or an augmented reality headset.

According to a further aspect, the invention provides a method for transmitting an image of display data such that a second image with parallax can be generated from it, comprising:
1. Generating a pair of images of display data to be displayed simultaneously (F1 and F2)
2. Comparing image F1 to image F2 to determine the disparity between locations in F1 and corresponding locations in F2
3. Determining the disparities which appear most frequently
4. Transmitting:
    a. The most common disparities
    b. Image F1
    c. A list of references to those disparities in the list of most common disparities required to recreate F2 from F1
5. Copying display data from F1 to the places indicated by the appropriate disparities to create image F2'
6. Displaying image F1 and image F2'

This method minimises the volume of data transmitted while allowing a second near-identical image to be transmitted. It serves as a compromise between transmitting the vector required for every tile in F2, which is inefficient, and transmitting only one vector for the whole of image F2, which is inaccurate, by providing a pool of disparity vectors which can be referred to using information associated with each tile.

BRIEF DESCRIPTION OF THE DRAWINGS

Embodiments of the invention will now be more fully described, by way of example, with reference to the drawings, of which:
FIG. 2c illustrates differences between the two images;
FIG. 4d shows the histogram with candidate values selected using a fourth method.

DETAILED DESCRIPTION OF THE DRAWINGS

Figure 1:
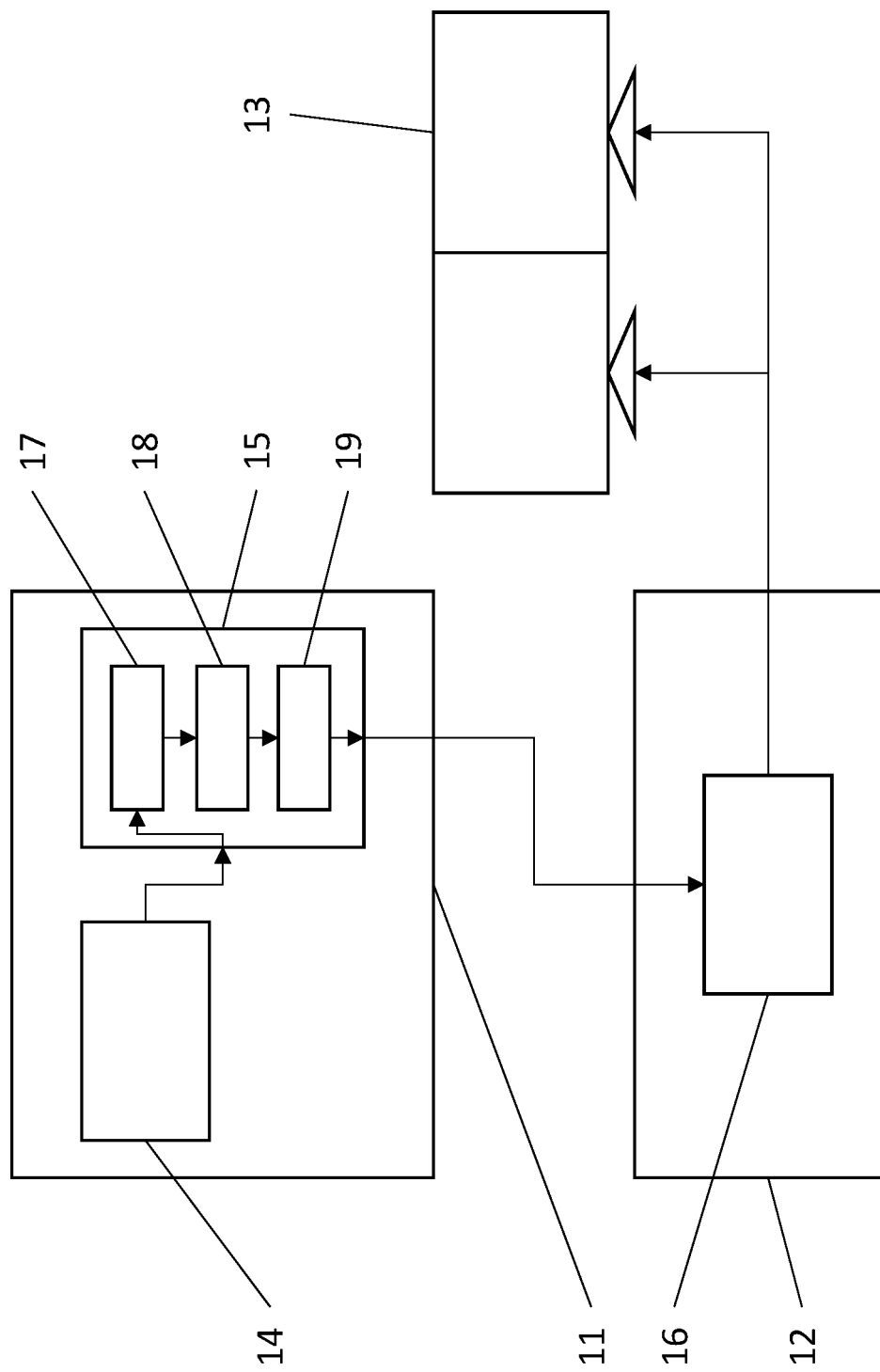
FIG. 1 shows a basic overview of the system.

FIG. 1 shows a basic overview of a display system. A host computing device [11] is connected to a display control device [12], which is in turn connected to a pair of display panels [13]. The host computing device [11] includes an application [14] which generates display data for display on the display panels [13], as well as a compression engine [15] which carries out the methods according to embodiments of the invention. The compression engine [15] includes three sub-engines: a disparity value generation engine [17], a candidate value generation engine [18], and an encoder [19].

The display control device [12] contains a regeneration engine [16] which regenerates the display data for display on the display panels [13].

In an embodiment such as a virtual-reality headset, the two display panels [13] are each presented to one of the user's eyes, and it is therefore necessary for them to display very similar images, though the images should not be identical to allow the headset to create an illusion of three dimensions through the use of parallax, by which objects appear to be in different positions relative to other objects in a view when viewed from different locations, such as the user's two eyes.

Figure 2A:
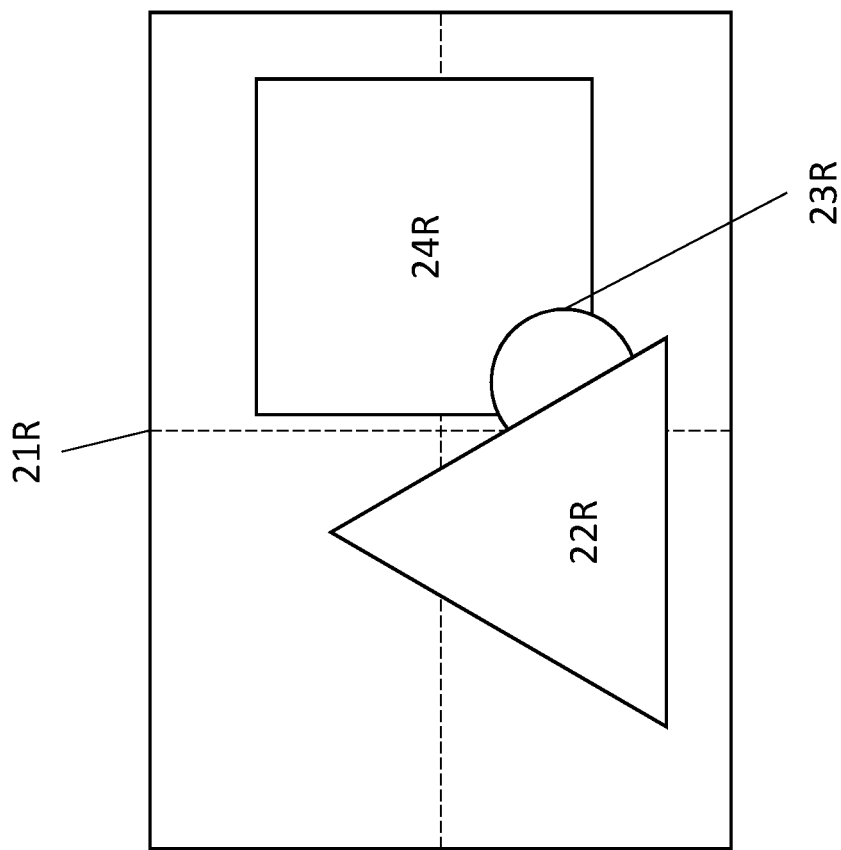
FIG. 2a shows two images demonstrating parallax.

FIG. 2a shows a stereoscopic pair of images [21] that could be displayed on the two display panels [13], demonstrating parallax. Both images show a triangle [22] in front of a circle [23], which is in turn in front of a square [24]. The dashed lines shown in the Figure are not in fact part of the images [21], but are shown in the Figure to make the differences in position of the three objects [22, 23, 24] in each image [21] more clear.

The object that demonstrates the largest difference is the triangle [22]. In the left-hand image [21L] it is close to centre, as shown by the proximity of the top point of the triangle [22L] to the central dashed line. In the right-hand image [21R] it is significantly to the left, as demonstrated by its distance from the central dashed line. Since this is the object that is perceived as closest to the viewer, it has the largest disparity between the images [21L, 21R]. The circle [23] is also located in a different place between the images [21]: in the left-hand image [21L] it is obscured by the triangle [22L], but located near to the central line without crossing it. In the right-hand image [21R] it has crossed the central line. Since the disparity of the circle [23] is less than the triangle [22], the triangle [22R] does not obscure so much of the circle [23R]. The square [24] does have a displacement, but only a small one, as it is perceived as being further from the user.

The images comprise a plurality of display elements, which may be the shapes themselves, portions of the shapes, or portions of each image regardless of the shapes, such as tiles or tile groups, being geometrically-shaped groups of pixels. However a display element is defined, a display element comprises a plurality of pixels.

Figure 2A:
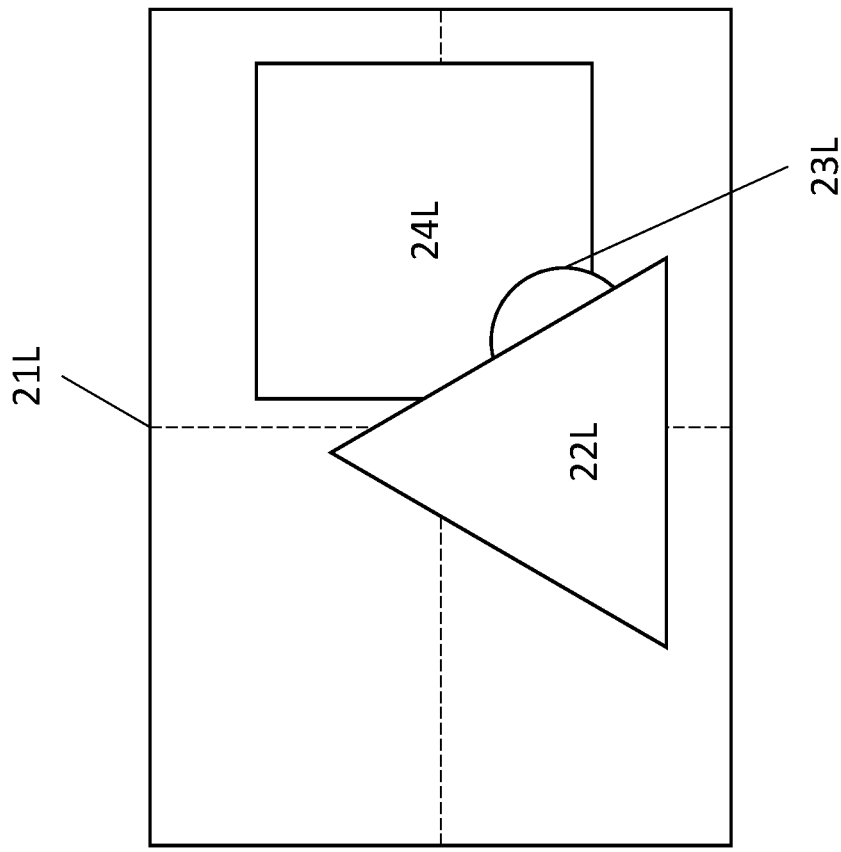
Figure 2B:
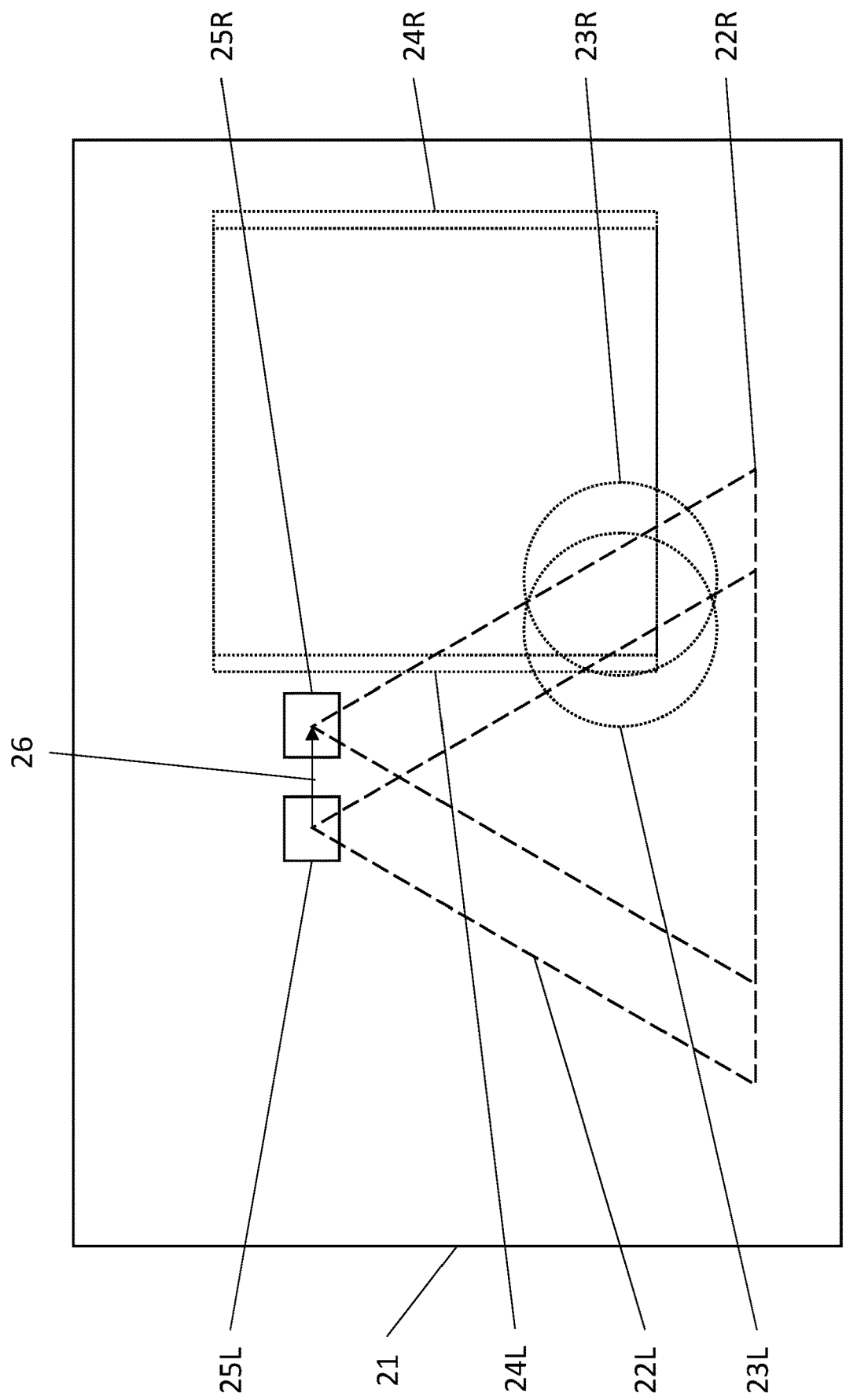
FIG. 2b shows differences in depth that produce parallax.

The difference between the images [21] shown in FIG. 2a is more clearly illustrated in FIG. 2b, in which they are shown superimposed on one another to demonstrate the disparities. One such disparity is shown: a tile [25] in each image [21] is identical, being the top point of the triangle [22]. In the right-hand image [21R], the location of the tile is displaced to the right compared to the left-hand image [21L]. This change in location is shown by a disparity value [26].

The majority of the display elements—tiles, in this example—in the two images [21] are likely to have such disparity values [26]. These disparity values [26] can then be used to generate the right-hand image from the left-hand image, or vice versa. As can be seen from the differences in the disparities of the shapes [22, 23, 24], attempting to use one disparity value for the entire image [21] would lead to an inaccurate result.

FIG. 2c shows the previously-described image [21] comprising a triangle [22], a circle [23], and a square [24], together with a background, as viewed from the "front": i.e., as seen by the viewer. As previously described, it will be represented when displayed by two slightly-different images

[21L, 21R], but here it is shown as a single image for clarity and to represent the objects [22, 23, 24] and their ordering.

The same three objects [22, 23, 24] are shown below the image [21] as viewed from the "side", with the direction of the viewer's gaze shown by the eye [27] at the left-hand side of the Figure. Accordingly, the objects [22, 23, 24] are then shown in order as they appear in the image [21]. The triangle [22] appears in front of the other two objects [23, 24] and accordingly is shown to the left, the circle [23] in the middle as it is between the triangle [22] and the square [24], and the square [24] is shown behind and therefore to the right of the group of objects [22, 23, 24]. Since the background is at infinity, it is not shown in the Figure.

FIG. 2c illustrates the depths [28] of the objects [22, 23, 24] shown in FIGS. 2a and 2b in order to clarify the connection between the depth [28] of the object [22, 23, 24] and the difference between its apparent location in the left-hand image [21L] and the right-hand image [21R]. For example, as previously mentioned, the triangle [22] appears closest to the viewer [27] and has the largest difference in location between the two images [21L, 21R]. This is due to the fact that the difference in locations is inversely proportional to the distance [28A] between the viewer [27] and the apparent location of the object [22].

Figure 3A:
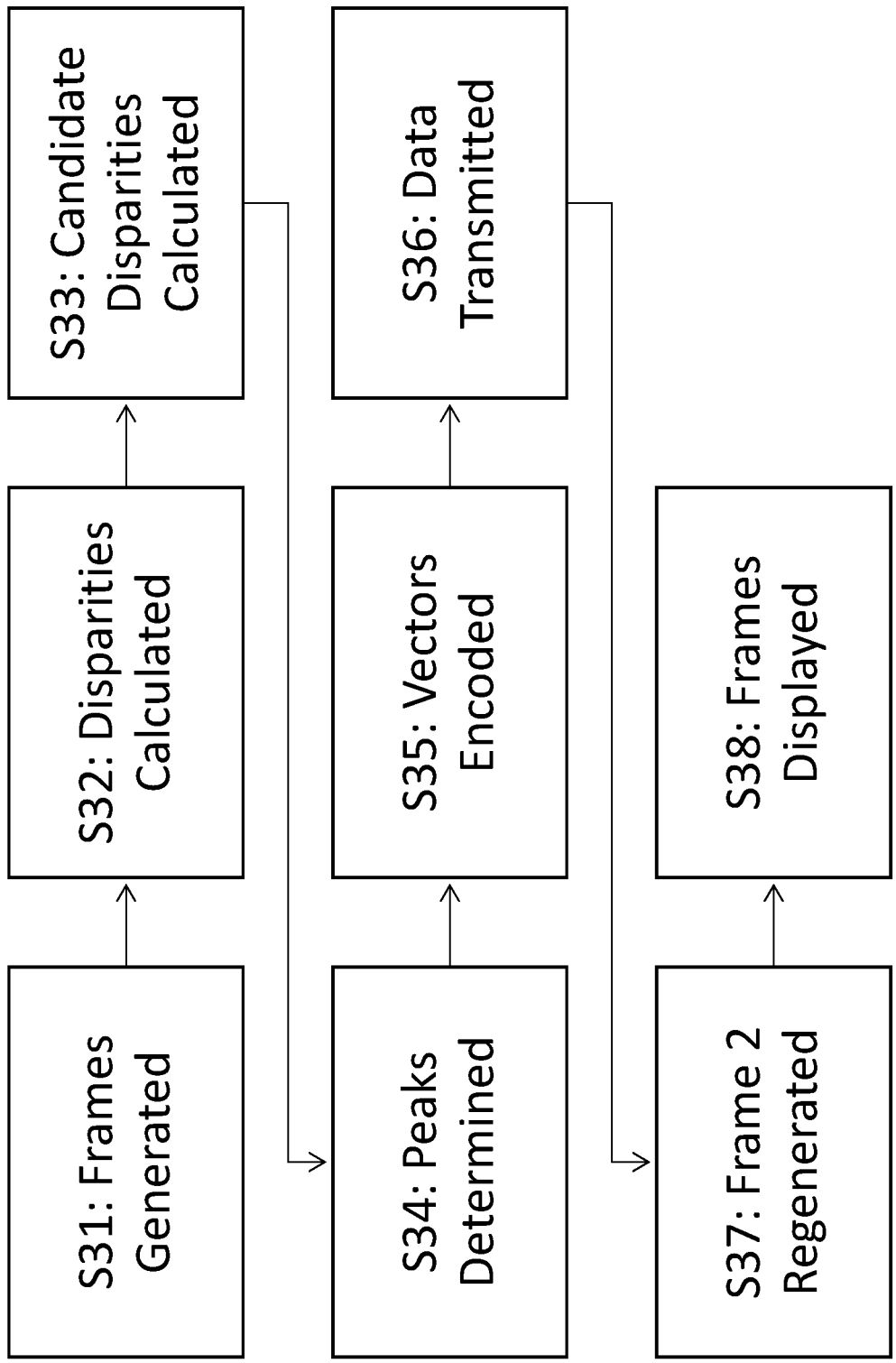
FIG. 3 shows a process of the generation and use of disparity values.
Figure 3C:
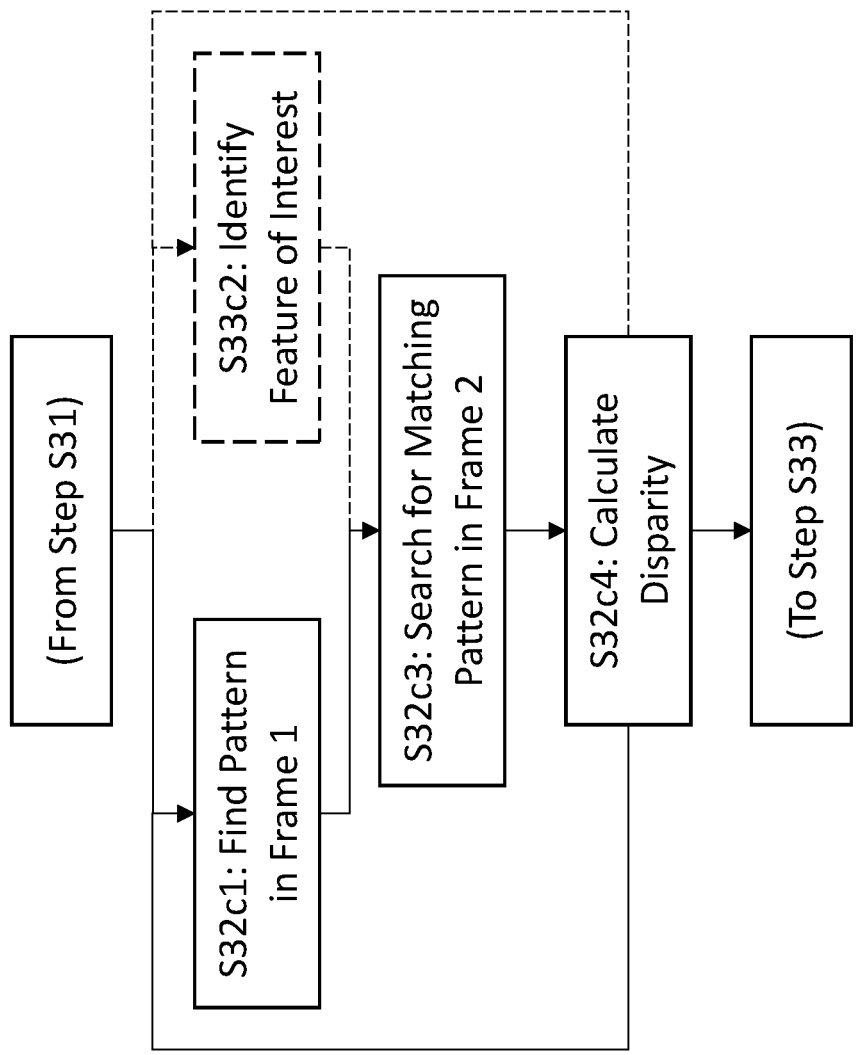
Figure 3B:
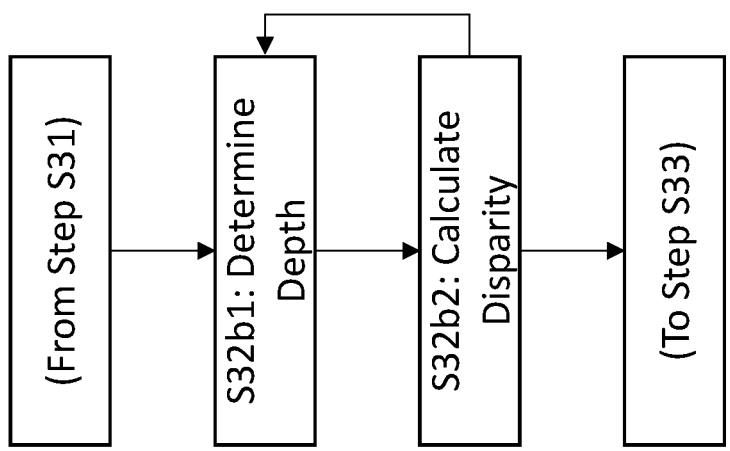

FIGS. 3a, 3b, and 3c show the process of embodiments of the invention.

At Step S31 of FIG. 3a, the images [21] are generated by the application [14] on the host [11]. As previously mentioned, two stereoscopic images [21] are generated, one of which will be presented to each eye, and they are likely to be largely identical except for the effects of parallax built into the images [21] to give the illusion of depth, as explained with reference to FIGS. 2a, 2b, and 2c. They are then passed to the compression engine [15].

At Step S32, the disparity value generation engine [17] generates a plurality of disparity values to represent the disparity between corresponding display elements. There are a variety of methods for doing this, and two examples are described in FIGS. 3b and 3c.

FIG. 3b shows a method based on the connection between the depth [28] of an object and the disparity between its locations in two stereoscopic images such as those shown in FIGS. 2a and 2b.

At Step S32b1, the disparity value generation engine [17] determines the "depth" of a pixel: i.e., the depth at which it is to be perceived [28], as described in FIG. 2c. In computer-generated images, it is likely that the depth [28] will be known to the application [14] and it may be provided together with the data.

At Step S32b2, the disparity value generation engine [17] determines the disparity value of the pixel, for example, using the formula:

$$\text{Depth} = \frac{K}{x1 - x2}$$

Where K is a constant and "x1-x2" represents the disparity value [26], being the difference between the pixel's location in the first image [21L] (x1) and its location in the second image [21R] (x2) as previously described.

This operation may be carried out for every pixel, or it may be carried out for groups of pixels; for example, each image may be divided into tiles and the average disparity value for each tile calculated using this formula, or the most frequent disparity value in an area or other display element may be used for the whole area or other display element.

Furthermore, in an image [21] such as that described in FIG. 2, all the pixels representing each object [22, 23, 24] are likely to have a similar depth [28] and therefore a whole object [22, 23, 24] may be treated as having that depth [28], meaning that all pixels representing that object [22, 23, 24] can be assumed to have the same disparity value [26]. Furthermore, all pixels making up all objects [22, 23, 24] at the same depth [28], forming a layer, may be assumed to have the same disparity value [26].

In any case, this method is repeated until disparity values [26] have been generated for all display elements, be they pixels, tiles, objects, or layers. The process then moves on to Step S33.

FIG. 3c shows a second possible method for generating disparity values [26] from the two images [21] generated at Step S31, based on comparisons between the two images [21]. The comparisons may involve searching for matching groups of pixels or matching points of interest. Accordingly, two branches are shown at the beginning of the process although later it converges to a single process.

In the first branch, at Step S32c1, the disparity value generation engine [17] identifies a pattern of pixels in one image [21L]. In this example, the image used is the left-hand image. Identification of a pattern of pixels may involve dividing the left-hand image [21L] into tiles [25] and taking each tile [25] as a pattern of pixels.

In the second branch, at Step S32c2, the disparity value generation engine [17] instead identifies a feature of interest in one image [21L]—in this example, the left-hand image. This may be, for example, a junction between two lines such as the point at which the bottom of the square [24] and the circle [23] intersect. The feature of interest may also include a number of surrounding pixels, such as a square of 50×50 pixels centred on the feature of interest.

In either case, at Step S32c3 the disparity value generation engine [17] searches for a matching pattern in the second frame [21R]: in this example, the right-hand frame. This means searching for display data containing substantially the same pattern of pixels or the same point of interest.

In the case where the disparity value generation engine [17] uses features of interest, the search function may be relatively straightforward, involving scanning a corresponding horizontal row in the right-hand image [21R] for the same feature such as a junction between two lines at the same angle. However, the search function may be more complex in the case where the disparity is calculated using matching patterns.

One method comprises calculating the "correlation" between areas by, for example, comparing the initial area [25L] to each of a plurality of areas of the same size and shape in roughly the same location in the second frame [21R] and calculating which of the comparison areas provides the best match. Commonly-used correlation values include Sum of Squared Differences, which is calculated using the following formula:

$$SSD_{\mathcal{A}}(F, G) = \sum_{s \in \mathcal{A}} |F(s) - G(s)|^2$$

And Sum of Absolute Differences, which is calculated using the following formula:

$$SAD_{\mathcal{A}}(F, G) = \sum_{S \in \mathcal{A}} |F(s) - G(s)|$$

In these formulae:
Σ means "Sum of"
∈ refers to an item within a set
A is an area or set of locations, which may be any shape
|x| means the absolute value of x
F and G refer to the two images being compared
s refers to a pixel location Such that the Sum of Squared Differences of an area between a first image and a second image is calculated by subtracting the value of each pixel comprising the pattern of pixels in the area in one frame from the value of the corresponding pixel in the search area, finding its absolute value, squaring that value, and adding together the results for all the pixels in the areas. As is clear from the equation above, the Sum of Absolute Differences is calculated in almost the same way except that the absolute value is not squared.

The Sum of Squared Differences, Sum of Absolute Differences, or other suitable value is calculated for each of a number of areas in the second image which might correspond to a particular area in the first image. The search area with the lowest figure as the result of this calculation is the best match for the original area, since a low level of difference indicates a high correlation value.

The area [25R] in the right-hand image [21R] that provides the best correlation for the initial area [25L] in the left-hand image [21L] can then be used for the calculation of the disparity [26] of that area between the images by comparing their locations. The amount by which the location of the initial area [25L] in the left-hand image [21L] is displaced compared to the location of the area [25R] in the right-hand image [21R] is used to generate the disparity value.

At Step S32c4, the disparity value generation engine [17] calculates the disparity between the point or area [25L] in the left-hand image [21L] and the identified corresponding point or area [25R] in the right-hand image [21R]. In this example, this is the vector that would be required to move the data from its location in the left-hand frame [21L] to the corresponding location in the right-hand frame [21R].

This process is repeated for all the areas or points of interest in the image.

When this part of the method is complete, there may be portions of the image [21] that do not contain points of interest and will therefore not have disparity values [26]. Disparity values [26] for these portions of the image [21] may be estimated using the disparity values [26] generated using points of interest such that, for example, the disparity values of the nearest two points of interest are averaged. Alternatively, disparity values [26] for these portions of the image [21] could be generated using the areas method as previously described, possibly using the disparity values [26] of nearby points of interest to guide the areas used for comparison. Finally, if a point of interest is part of a display element such as a tile, shape, or layer, the whole display element may be considered as having that disparity value.

The process then proceeds to Step S33 in FIG. 3a: the disparity value generation engine [17] passes the disparity values [26] to the candidate value generation engine [18], which reduces the number of disparity values to produce a reduced set of disparity values. There are a number of methods for doing this, which are described with reference to FIGS. 4a, 4b, 4c, and 4d.

Figure 4A:
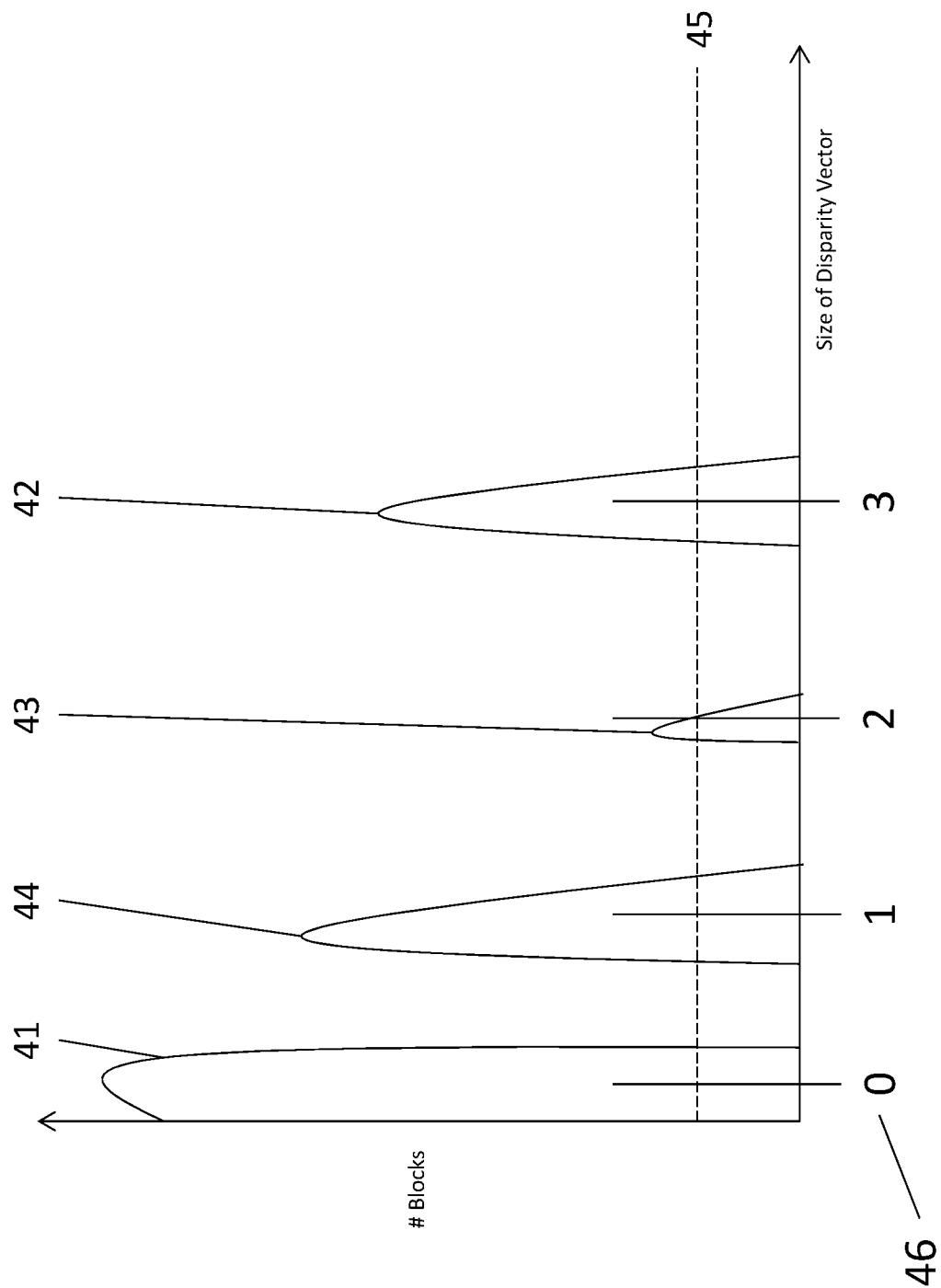
FIG. 4a shows a histogram generated from the disparity values with the selected candidate values.

For the method shown in FIG. 4a, the candidate value generation engine [18] collects the disparity values [26] generated at Step S32 and produces (as per step 34) a histogram showing the frequency of occurrence of different disparity values. The histogram charts the values against the number of disparity values of each size, so the most common disparity values are represented by peaks in the histogram. FIG. 4a shows an example of such a histogram, which might be generated from the application of this method to the two images [21L, 21R] shown in FIG. 2 using tiles as display elements. It is a graph with the frequency on the Y axis and the size of the disparity value on the X axis. Since in this example there are four objects, including the background, there are four peaks [41, 42, 43, 44].

The left-most peak [41] represents a very small disparity value, as is shown by the fact that it is closest to 0 on the X axis. It is the largest peak as it represents the largest number of tiles associated with disparity values of a single size; in this case, it represents the tiles showing the background of the images [21], which does not change with parallax since it is at or close to infinity.

The next peak [44] represents a slightly larger disparity value which occurs with lower frequency. In this example, it represents the square [24], which, as can be seen in FIG. 2, is not displaced far by parallax since it is at a greater depth than the other objects and therefore its tiles are associated with a small but non-zero disparity value. Since it is a large shape, there are many tiles associated with it.

The next peak [43] represents the circle [23]. Since it is a small shape and only a small part of it is visible, it has very few tiles, as is shown by the fact that it is represented by a small peak [43]. However, it is further to the right on the graph than the peak [44] representing the square [24] because it is moved more to represent parallax, as is shown in FIG. 3.

Finally, the fourth peak [42] represents the triangle [22]. The tiles comprising the triangle [22] have the greatest disparity value as the triangle [22], being pictured towards the front of the group, has the largest parallax and therefore moves the most between the left [21L] and right [21R] images. Since it is a relatively large shape and is not obscured by any other shapes, there is a large number of tiles associated with it and it therefore has a relatively high peak [42].

Figure 4B:
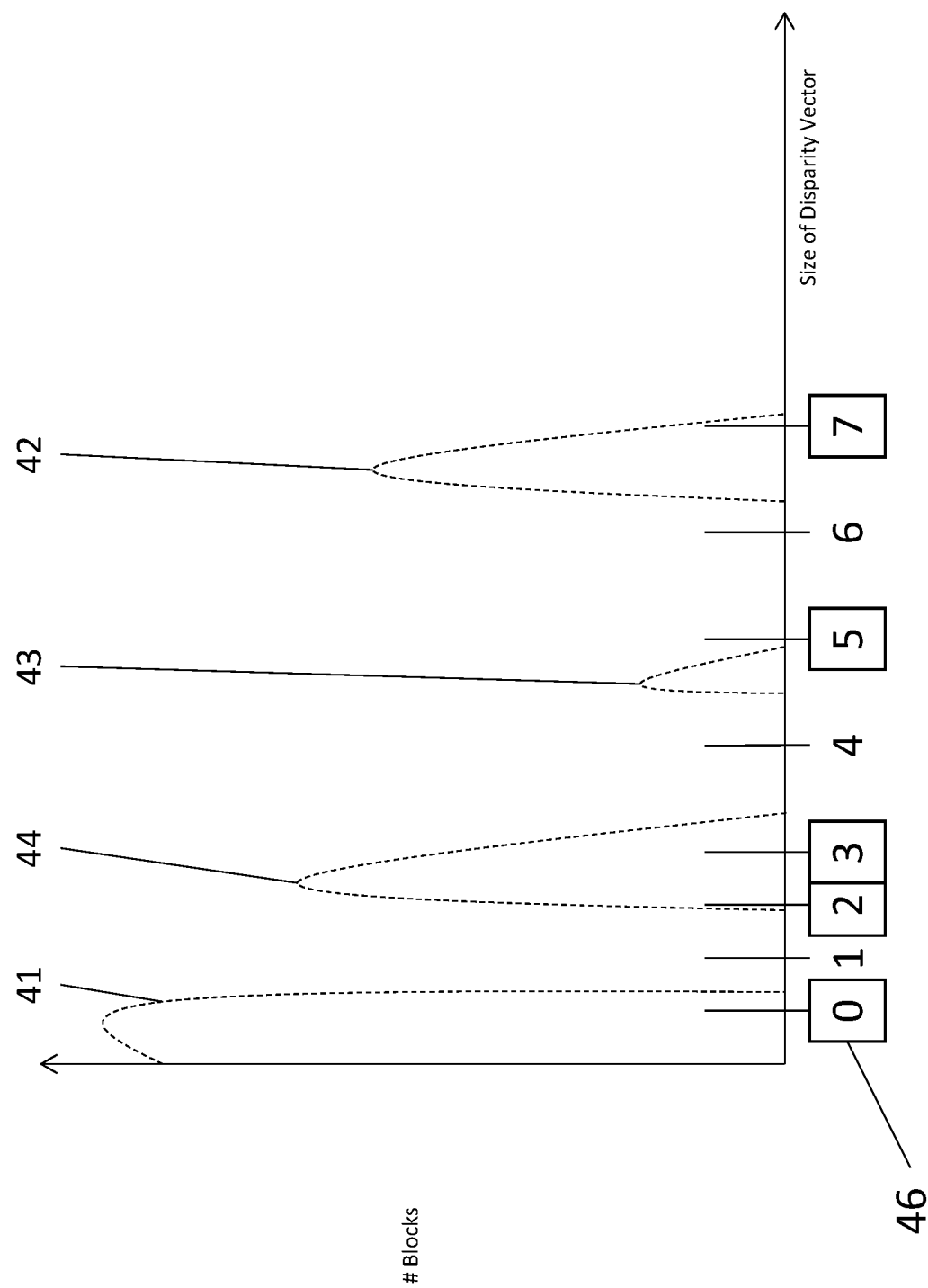
FIG. 4b shows the same histogram with candidate values selected using a different method.
Figure 4C:
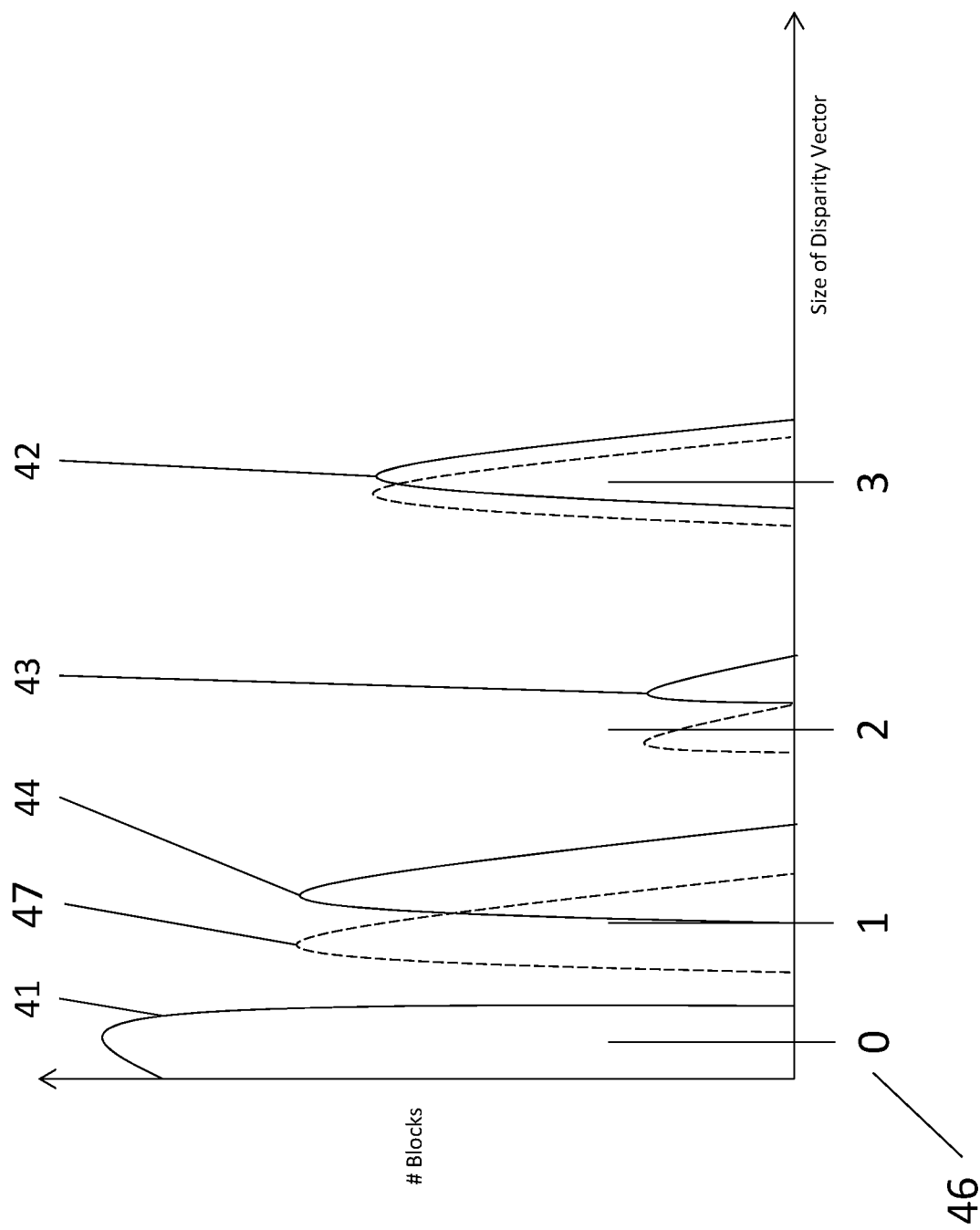
FIG. 4c shows candidate values generated through quantisation.

This is also the histogram that is used in FIGS. 4b and 4c.

Depending on the shapes involved, the peaks [41, 42, 43, 44] may be very narrow or very wide. In this case, there is assumed to be some depth to the shapes [22, 23, 24] and they therefore have relatively wide peaks since different parts of the same shape may have slightly different disparity values. In a case where the shapes [22, 23, 24] were two-dimensional and the entire shape had the same parallax, the peaks would be extremely narrow. Depending on the embodiment, wide peaks [41, 42, 43, 44] may be represented by multiple different disparity values [46], or rounded to the single most common disparity value [46] within the peak [41, 42, 43, 44] through a mechanism such as quantisation.

The disparity value [26] for each display element may then be compared to each of the candidate disparity values [46] in order to determine which candidate disparity value [46] has the smallest difference from the actual disparity value [26] of the display element, and this candidate disparity value [46] will be used for that display element. Since this method does not require knowledge of the data other than the disparity values [26], it is likely to be useful when dealing with external images such as input from cameras.

FIG. 4a also shows a threshold value [55], which can be used by the candidate value generation engine [18] to determine which peaks [51, 52, 53, 54] should be encoded.

The histogram allows the candidate value generation engine [18] to identify the most frequently occurring disparity values [26] at Step S45 to form a pool of candidate disparity values [46], indicated in the Figure by vertical lines labelled 0, 1, 2, 3. These are passed to the encoder [19].

FIG. 4b shows an alternative method of identifying candidate disparity values [46] using possible candidate disparity values at spaced-apart sizes. This example shows the same histogram as that shown in FIG. 4a, with the peaks [41, 42, 43, 44] shown in dashed lines. There are also eight possible candidate disparity values [46] at regular intervals, with the intervals being smaller at the left-hand side of the x axis of the histogram since this is the area in which the actual disparity values [26] appear at the highest frequency. The candidate value generation engine [18] can then use all or a subset of the pre-generated candidate disparity values [46].

This method allows the candidate value generation engine [18] to divide the actual disparity values [26] between regularly-spaced categories, selecting the closest of the pre-generated categories to represent the actual disparity values [26]. The selected candidate disparity values are then passed to the encoder [19].

FIG. 4c shows a final example histogram showing the peaks [41, 42, 43, 44] produced using the image shown in FIG. 2 as solid lines and the peaks [47] produced using historical images as dashed lines. These historical peaks [47] are used to pre-determine potential candidate disparity values [46] based on numbers of different disparity values used in historical reduced sets of disparity values. These predetermined potential candidate disparity values [46] are marked with numbers and vertical lines as in FIGS. 4a and 4b. In this example, there is one vertical line for each historical peak [47], but there may be more potential candidate disparity values [46] up to and including a potential candidate disparity value [46] for every display element in the historical images. All of these potential candidate disparity values [46] may be used or a subset, which is preferably less than the average number of disparity values in the historical set.

This method allows pre-generated values to be selected with reference to historical information and therefore more accurately than the method shown in FIG. 4b.

Finally, FIG. 4d shows another alternative method of selecting candidate values using quantisation. The process of quantisation involves either rounding a value, or dividing each value by a constant to reduce its size and then rounding, in order to group the values into a smaller number of categories. The quantisation constant may be selected to be sufficient to reduce the number of different disparity values.

FIG. 4d first shows a set of twelve binary numbers with their decimal equivalents [48], prior to quantisation. Only one number (1011=11) is repeated, meaning that there are eleven unique disparity values. These numbers are quantised by being divided by four: i.e. sifted to the right by two bits and the last two bits of the original numbers discarded. This results in only four unique disparity values [46], as shown on the right-hand side of the Figure. These act as candidate disparity values.

Returning to FIG. 3a, at step S35, a number of the candidate values [46] may be selected to form the final reduced set and encoded for transmission. The method for selecting the candidate values [46] to be used and encoded depends on the method with which they were produced. For example, in the case of the method shown in FIG. 4a, the encoder [19] may encode all the candidate disparity values [46] that appear in the set of actual disparity values with a frequency above a threshold [55] such as that shown in FIG. 4a, or it may only encode up to a pre-programmed number of candidate disparity values [46]: for example, if the candidate value generation engine [18] had produced the histogram shown in FIG. 4a and the encoder [19] were pre-programmed to only encode three disparity values, it might only encode those [41, 44, 42] associated with the background, the square [24], and the triangle [22], since while the peak [53] associated with the circle [23] is above the threshold [55] it has the lowest frequency.

Candidate disparity values [46] produced by the process described in FIG. 4b may be selected by, for example, selecting the pre-generated candidate values [46] that are similar to the highest number of actual disparity values as indicated by the peaks [41, 42, 43, 44] of the histogram: in this case, this could mean the pre-generated candidate disparity values [46] shown in the Figure highlighted with boxes (0, 2, 3, 5, 7) as they are closest to peaks [41, 42, 43, 44] in the histogram.

The process described in FIG. 4c may result in the selection of all of the historical candidate values [46], for example in a case like that shown in FIG. 4c where one historical disparity value [46] is shown for each peak [41, 42, 43, 44]. Alternatively, where there are more historical disparity values available, a subset may be used.

Finally, the process shown in FIG. 4d may result in the selection of all the candidate disparity values [46] generated by quantisation or a subset may be generated by, for example, further quantisation or a frequency threshold.

Each actual disparity value [26] is associated with the candidate disparity value [46] which is most similar to it, either because it matches exactly or because it matches to within a threshold of accuracy which may be simply that it matches that candidate disparity value [46] better than any other. This association allows the actual disparity value [26] to be replaced by a reference to the candidate disparity value [46] with which it is associated. That candidate disparity value is therefore associated with the display element, and hence its location and displaced location, with which the actual disparity value [26] was associated.

Figure 5:
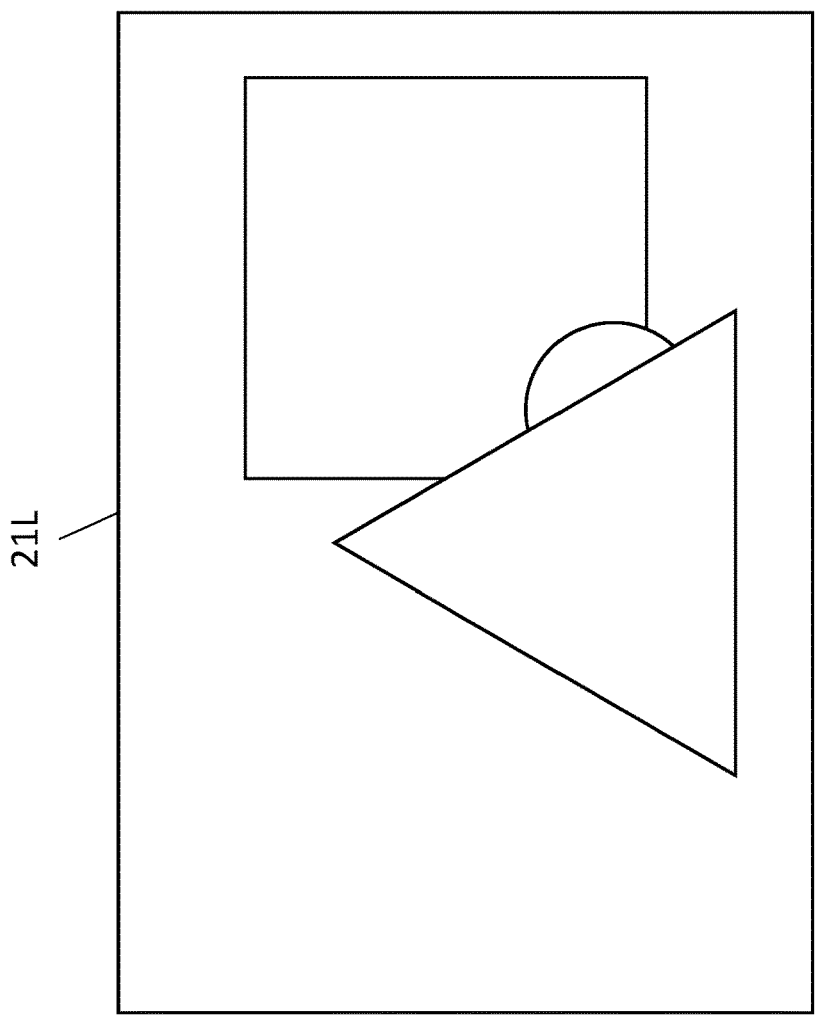
FIG. 5 shows the data sent to the display control device.
Figure 5:
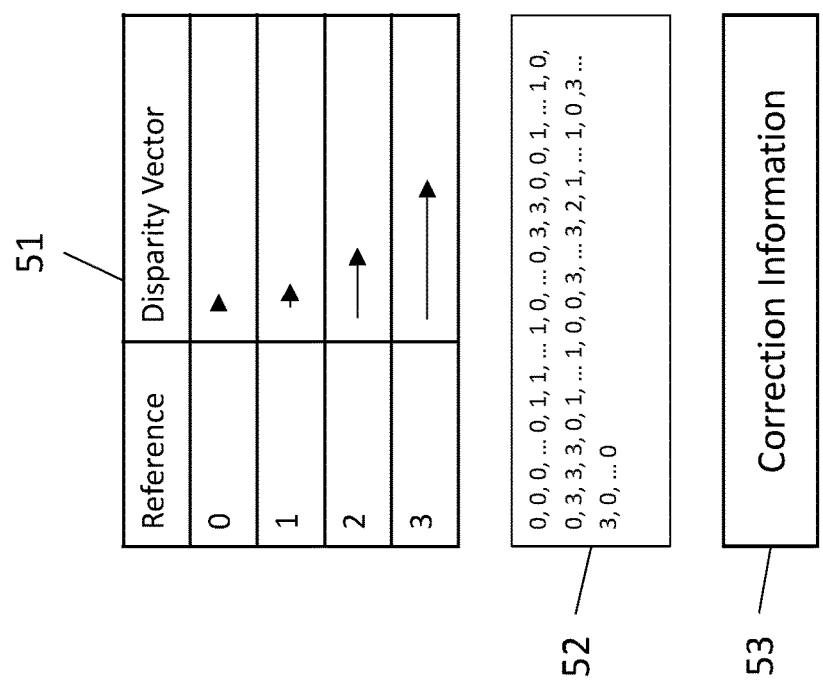

FIG. 5 shows an example of the data produced by the encoder [19] and transmitted by the compression engine [15] on the host [11] to the regeneration engine [16] on the display control device [12].

This data comprises, first, the left-hand image [21L]. This is required both for display and for regeneration of the right-hand image [21R] using the methods of this embodiment of the invention. It may be transmitted as tiles, or as a stream of data which is then stored in an image buffer. It may additionally be encoded and/or compressed using other methods.

There is also a table representing the pool of disparity values [51] generated by the candidate value generation engine [18] and encoded as the reduced set of disparity values at Step S35. This example continues the examples shown in FIGS. 2 and 4a and there are therefore four candidate disparity values, corresponding to the four peaks [41, 42, 43, 44] shown in the histogram in FIG. 4a, here shown in order of size and therefore in order from left to right along the X axis of the histogram. Accordingly, the first disparity value, which is the shortest, is associated with the background, the second with the square [24], the third with the circle [23], and the fourth with the triangle [22], as previously described. If another method were used, there might be a different number of disparity values in the pool.

For example, if the method described with reference to FIG. 4b were used there might be five disparity values in the pool corresponding to the possible candidate disparity values [46] shown in FIG. 4b outlined with boxes (0, 2, 3, 5, 7). These are selected based on the fact that they correspond to the peaks [41, 42, 43, 44] in the actual histogram, as previously mentioned. Furthermore, if the method described with reference to FIG. 4c were used the four possible candidate disparity values [46] shown in FIG. 4c (0, 1, 2, 3) might be used. Finally, if the method described with reference to FIG. 4d were used and the actual disparity values [48] were quantised, the reduced set of four disparity values [46] shown in the list on the right-hand side of FIG. 4d (0, 1, 2, 3) might be used as the pool of disparity values [51].

In practice, disparity values are likely to be represented by numbers such as co-ordinates, such that the fourth disparity value in the pool [51] might be represented as (4, 0), indicating a vector of four units to the right and none vertically. Since in this system there will not normally be a vertical component to any vector, since the disparity values represent the different views seen by a user's two eyes, the vertical component of the vector could be omitted entirely and the vector rendered as (4). These are the numbers that are quantised in the method shown in FIG. 4d in order to produce the reduced set [46] of candidate disparity values. These numbers will be represented by arrows in the Figure for clarity.

The disparity values in the pool of disparity values [51] are associated with reference numbers [52], which can be transmitted in place of the actual disparity values themselves. This means that a minimal volume of data is needed to represent the disparity values associated with all the display elements in the left-hand image [21L]. The regeneration engine [16] can then derive the relevant disparity values in the pool [51] from the reference numbers [52].

The transmitted references [52] are also shown in FIG. 5. They can be transmitted as a stream in order so that they can be associated with the display elements in the left-hand image [21L]—this method may be especially appropriate where the display elements are tiles and therefore suitable for transmission in a predictable stream—or they may be transmitted alongside their corresponding display elements, or the display elements may also be associated with reference numbers and these reference numbers associated with the encoded candidate disparity values in the pool of disparity values [51] either directly or via their references [52].

FIG. 5 also shows correction information [53]. This is optionally generated by the compression engine [15] when encoding the disparity values. It will allow the copied display data from the left-hand image [21L] to be slightly amended in order to account for the fact that a tile in the left-hand image [21L] may not be perfectly represented in the right-hand image [21R]; for example, in the images shown in FIGS. 2a and 2b the side of the triangle [22] intersects the edges of the circle [23] in different places in the two images [21], resulting in the lines representing the sides of the circle [23] meeting the line representing the side of the triangle [22] at a different angle. The correction information [53] for such tiles may include an instruction to slightly re-draw the sides of the circle [23R] at the correct angle.

Furthermore, the correction information [53] may include corrections to the disparity values in the pool [51] themselves, since they may be approximations regardless of the method used to generate them. For example, the histograms in FIGS. 4a, 4b, and 4c show variation of the disparity values in the width of the different peaks [41, 42, 43, 44], and the nature of quantisation as described in FIG. 4d is to reduce detail.

The correction information [53] may also include instructions for dealing with cases where two display elements from the left-hand image [21L] overlap in the right-hand image [21R], and for filling gaps between copied areas of display data, for example with colour.

Naturally, units of correction information will be associated with locations, references [52] or display elements as appropriate in order to allow the corrections to be properly applied during regeneration of the right-hand image [21R].

While the inclusion of correction information [53] involves more data transmission than transmitting one image [21L] and the encoded disparity values [51, 52] alone, the total volume of data is still likely to be less than if the host [11] transmitted two entire images [21L, 21R] and fidelity will be higher than if the correction information [53] were omitted, improving user experience.

This data is transmitted by the host [11] to the display control device [12], as shown at step S36 in FIG. 3a. It is a significantly smaller volume of data than the full two images [21L, 21R] because the values are themselves smaller units of data than tiles and the references are small numbers. Furthermore, as is visible in FIG. 5, similar references are likely to appear together, so if the references [52] are transmitted as a stream they may be referred to en masse, so "0, 0, 0, 0" becomes "4x0", allowing a further reduction in data volume.

At Step S37, on the display control device [12], the image [21L], value pool [51], and references [52] are received by the regeneration engine [16]. The display data comprising the image [21L], having been decompressed, decoded, and/or decrypted if necessary, may be saved in an image buffer in preparation for display, but the regeneration engine [16] also regenerates the right-hand image [21R] from the left-hand image [21L], disparity value pool [51], and references [52].

For every display element in the left-hand image [21L], the regeneration engine [16] also receives a reference [52] to the disparity value in the pool [51] corresponding to the location of that display element in the left-hand image [21L]. It uses the referenced disparity value from the pool [51] to determine a displaced location in the regenerated right-hand image, then copies the display data from the appropriate location in the left-hand image [21L] to the determined location in a second image buffer. This results in a new right-hand image which, while possibly not identical to the original right-hand image [21R], is unlikely to be sufficiently different to cause disruption to the user. The correction information [53] can also be used to improve the fidelity of the regenerated right-hand image to the original right-hand image [21R] and to deal with any conflicts or overlaps between tiles.

At Step S38, both images [21] are sent to the associated display panels [13] for display.

Figure 6:
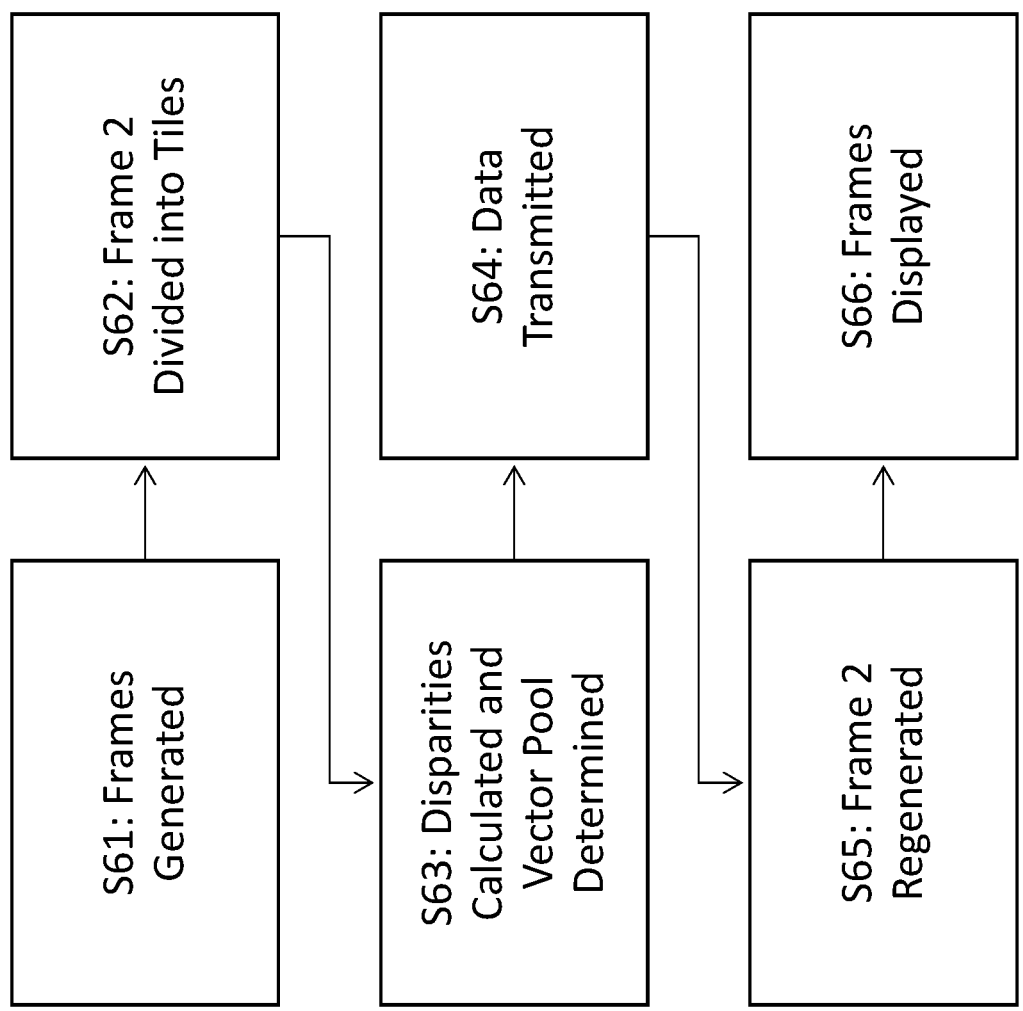
FIG. 6 shows an alternative process of the generation and use of disparity values.

FIG. 6 shows an alternative method. At Step S61, the two images [21] are generated on the host [11] as previously described. At Step S62, however, the right-hand image [21R] is divided into display elements—tiles, patterns, objects, layers, or points of interest as previously described—in the disparity value generation engine [17] and at Step S63 the right-hand image [21R] is compared to the left-hand image [21L] to find the location in the left-hand image [21L] of the display data that matches each tile [31] most accurately, or the depth of relevant pixels, also as previously described. The resulting disparity values are then used to generate a pool of candidate disparity values [51] using one of the methods previously described.

At Step S64, data is transmitted by the host [11] to the display control device [12]. In this embodiment, although the candidate disparity values [51] and reference numbers [52] were generated with reference to tiles in the right-hand image [21R], the left-hand image [21L] is still transmitted to the display control device [12] as described in FIG. 5. As previously mentioned, it is accompanied by the pool of disparity values [51], a collection of reference numbers [52] referring to the disparity values in the pool [51], and in some embodiments appropriate correction information [53]. Unlike the example previously described, the reference numbers [52] and candidate disparity values [51] transmitted with the left-hand image [21L] do not refer to locations or display elements in the left-hand image [21L], but to displaced locations in the right-hand image [21R], which is not transmitted.

At Step S65, the right-hand image is regenerated from the left-hand image [21L], the disparity value pool [51], and the reference numbers [52]: For each transmitted reference number [52], the regeneration engine [16] first assumes that the corresponding display element in the left-hand image [21L] is in the same location as it will eventually occupy in the regenerated right-hand image (for example, the middle of the right-hand edge). It then takes the reference number [52] associated with that location and fetches the appropriate disparity value from the disparity value pool [51] and uses it to calculate the corresponding location in the left-hand image [21L]. It is then able to copy a portion of the display data at that location in the left-hand image [21L] (for example, one unit to the left of the middle of the right-hand edge) into the displaced location of the display element in the regenerated right-hand image (the middle of the right-hand edge). This means that less correction information may be needed as there is less likely to be overlap or gaps between display elements in the regenerated right-hand image.

At Step S66, the images are then sent to the appropriate display panels [13] for display.

These methods improve the coding of display data in order to reduce the volume of data being transmitted across a limited-bandwidth connection. This will allow the system to transmit data more quickly and with less risk of data loss or interference.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and engines/modules which are described as separate may be combined into single engines/modules and vice versa. Functionality of the engines or other modules may be embodied in one or more hardware processing device(s) e.g. processors and/or in one or more software modules, or in any appropriate combination of hardware devices and software modules. Furthermore, software instructions to implement the described methods may be provided on a computer readable medium.

The invention claimed is:

1. A method for compressing data comprising a stereoscopic pair of images which provide parallax, when viewed by left and right eyes of an observer, so as to appear to the observer as a single 3D image, the method comprising:
    generating the stereoscopic pair of images, each image comprising a plurality of display elements, wherein each display element comprises a plurality of pixels;
    generating a disparity value indicating an amount by which a location of each display element in a first image of the stereoscopic pair of images is displaced compared to a displaced location of the same display element in a second image of the stereoscopic pair of images, whereby a plurality of disparity values is generated;
    reducing a number of different disparity values present in the plurality of disparity values to produce a reduced set of different disparity values;
    determining a particular disparity value from the reduced set of different disparity values to be associated with each of the locations and/or displaced locations of the display elements; and
    generating compressed data comprising the first image of the stereoscopic pair of images, the reduced set of different disparity values, and information indicating the particular disparity value associated with each of the locations and/or displaced locations to be used to regenerate a regenerated second image of the stereoscopic pair of images corresponding to the second image.

2. The method of claim 1, further comprising:
    obtaining depth information for each of the pixels in a display element;
    generating a disparity value for each pixel based on the depth information; and
    using the disparity values for the pixels to generate a disparity value for the display element,
    optionally wherein the disparity value for the display element is generated by using the most frequent of the disparity values for the pixels in the display element.

3. The method of claim 1, wherein generating the disparity values comprises comparing the first image of the stereoscopic pair of images with the second image of the stereoscopic pair of images to determine the amount by which a location of each display element in the first image is displaced compared to a displaced location of the same display element in the second image.

4. The method of claim 3, wherein generating a disparity value comprises correlating patterns of pixels in each display element in the first image with patterns of pixels in the second image to determine a displacement of a matching pattern of pixels, optionally wherein generating a disparity value comprises:
    calculating a correlation value for each of a plurality of patterns of pixels in each display elements in the first image with patterns of pixels in the second image;
    determining a best matching pattern of pixels as the matching pattern of pixels with the highest correlation value; and
    using the amount by which a location of the best matching pattern in the first image is displaced compared to a displaced location of the same best matching pattern in the second image to generate the disparity value for the display element.

5. The method of claim 3, wherein generating a disparity value comprises:
    determining a feature of interest in a display element at a location in the first image;
    determining a displaced location of the feature of interest in the second image to determine a displacement of the feature of interest and generating a disparity value for the feature of interest from the displacement; and generating the disparity value for the display element from the disparity value for the feature of interest, optionally wherein a disparity value is generated for each of a plurality of features of interest in a display element, and disparity values are determined for other pixels in the display element by interpolating/extrapolating from the disparity values for the plurality of features of interest based on locations of the other pixels relative to the features of interest, wherein the disparity value for the display element is generated from the disparity values for the features of interest and the other pixels in the display element.

6. The method of claim 1, wherein reducing the number of different disparity values present in the plurality of disparity values to produce a reduced set of different disparity values comprises:

determining different disparity values in the plurality of disparity values;

determining a frequency of occurrence of each of the different disparity values in the plurality of disparity values, and including in the reduced set of different disparity values a number, but not all, of the most frequently occurring different disparity values.

7. The method of claim 1, wherein reducing the number of different disparity values present in the plurality of disparity values to produce a reduced set of different disparity values comprises:

determining different disparity values in the plurality of disparity values;

determining a frequency of occurrence of each of the different disparity values in the plurality of disparity values, and including in the reduced set of different disparity values a number, but not all, of the different disparity values occurring at spaced apart frequencies, optionally wherein the spaced apart frequencies are spaced more closely at higher frequencies that at lower frequencies of occurrence of the different disparity values.

8. The method of claim 1, wherein reducing the number of different disparity values present in the plurality of disparity values to produce a reduced set of different disparity values comprises:

determining different disparity values in the plurality of disparity values;

quantising each of the different disparity values by an amount sufficient to reduce the number of different disparity values; and including in the reduced set of different disparity values the quantised different disparity values.

9. The method of claim 1, wherein reducing the number of different disparity values present in the plurality of disparity values to produce a reduced set of different disparity values comprises:

predetermining different disparity values based on knowledge of numbers of different disparity values used in historical reduced sets of different disparity values; and including in the reduced set of different disparity values the predetermined different disparity values.

10. The method of claim 1, wherein reducing the number of different disparity values present in the plurality of disparity values to produce a reduced set of different disparity values comprises:

predetermining different disparity values based on historical pluralities of disparity values from preceding stereoscopic pairs of images, the predetermined different disparity values being less than an average number of different disparity values in the historical pluralities of disparity values; and including in the reduced set of different disparity values the predetermined different disparity values.

11. The method of claim 1, wherein the display elements are tiles into which each of the stereoscopic pair of images are divided.

12. The method of claim 1, wherein the information indicating the particular disparity value that is associated with each of the locations and/or displaced locations to regenerate the regenerated second image of the stereoscopic pair of images comprises a reference to the particular disparity value in the reduced set of different disparity values.

13. The method of claim 1, wherein the compressed data further comprises correction information,. optionally wherein the correction information comprises a correction to the particular disparity value associated with a particular one of the locations and/or displaced locations, and optionally wherein the correction information comprises correction information for regenerating the regenerated second image of the stereoscopic pair of images if particular disparity values associated with two or more particular locations and/or displaced locations result in the display elements at those particular locations in the regenerated second image overlapping or having gaps therebetween.

14. The method of claim 1, further comprising:

transmitting the compressed data to a display control device; receiving, at the display control device, the transmitted compressed data; and regenerating the stereoscopic pair of images from the received compressed data.

15. The method of claim 14, wherein regenerating the stereoscopic pair of images from the received compressed data comprises:

regenerating a regenerated first image of the regenerated stereoscopic pair of images corresponding to the first image using the first image of the stereoscopic pair of images from the compressed data; and regenerating the regenerated second image of the regenerated stereoscopic pair of images corresponding to the second image using the first image of the stereoscopic pair of images from the compressed data, the reduced set of different disparity values, and the information indicating particular disparity values associated with each of the locations and/or displaced locations.

16. The method of claim 15, wherein either:

a) each disparity value is associated with a location in the first image and regenerating the regenerated second image comprises:

based on the location of each display element in the first image, determining a corresponding location of a corresponding display element in the regenerated first image; and copying each of the corresponding display elements of the regenerated first image into a displaced location in the regenerated second image based on the particular disparity value associated with the location in the first image; or b) each disparity value is associated with a displaced location in the second image and regenerating the regenerated second image comprises:

for each displaced location in the regenerated second image, determining a location in the regenerated first image based on the disparity value associated with the displaced location in the second image; and copying a portion of the regenerated first image at the location in the regenerated first image into the displaced location in the regenerated second image, the portion corresponding to a display element.

17. A host device configured to:

generate a stereoscopic pair of images which provide parallax, when viewed by left and right eyes of an observer, so as to appear to the observer as a single 3D image, each image comprising a plurality of display elements, wherein each display element comprises a plurality of pixels;

generate a disparity value indicating an amount by which a location of each display element in a first image of the stereoscopic pair of images is displaced compared to a displaced location of the same display element in a second image of the stereoscopic pair of images, whereby a plurality of disparity values is generated;

reduce a number of different disparity values present in the plurality of disparity values to produce a reduced set of different disparity values;

determine a particular disparity value from the reduced set of different disparity values to be associated with each of the locations and/or displaced locations of the display elements; and generate compressed data comprising the first image of the stereoscopic pair of images, the reduced set of different disparity values, and information indicating the particular disparity value associated with each of the locations and/or displaced locations to be used to regenerate a regenerated second image of the stereoscopic pair of images corresponding to the second image.

18. A system comprising the host device of claim 17, a display control device and a pair of display panels for displaying the pair of stereoscopic images, wherein the host device is configured to transmit the compressed data to the display control device, and the display control device is configured to:

receive the transmitted compressed data; and regenerate the stereoscopic pair of images from the received compressed data.

19. The system according to claim 18, wherein the display control device and the pair of display panels are incorporated in a wearable headset, optionally wherein the wearable headset comprises a virtual reality or an augmented reality headset.

20. The host device of claim 17, further configured to:

obtain depth information for each of the pixels in a display element;

generate a disparity value for each pixel based on the depth information; and use the disparity values for the pixels to generate a disparity value for the display element, optionally wherein the disparity value for the display element is generated by using the most frequent of the disparity values for the pixels in the display element.

21. The host device of claim 17, wherein the host device is configured to generate the disparity value by comparing the first image of the stereoscopic pair of images with the second image of the stereoscopic pair of images to determine the amount by which a location of each display element in the first image is displaced compared to a displaced location of the same display element in the second image.

22. The host device of claim 21, wherein the host device is configured to generate the disparity value by correlating patterns of pixels in each display element in the first image with patterns of pixels in the second image to determine a displacement of a matching pattern of pixels, optionally wherein the host device is configured to generate the disparity value by:

calculating a correlation value for each of a plurality of patterns of pixels in each display elements in the first image with patterns of pixels in the second image;

determining a best matching pattern of pixels as the matching pattern of pixels with the highest correlation value; and using the amount by which a location of the best matching pattern in the first image is displaced compared to a displaced location of the same best matching pattern in the second image to generate the disparity value for the display element.

23. The host device of claim 21, wherein the host device is configured to generate the disparity value by:

determining a feature of interest in a display element at a location in the first image;

determining a displaced location of the feature of interest in the second image to determine a displacement of the feature of interest and generating a disparity value for the feature of interest from the displacement; and generating the disparity value for the display element from the disparity value for the feature of interest, optionally wherein a disparity value is generated for each of a plurality of features of interest in a display element, and disparity values are determined for other pixels in the display element by interpolating/extrapolating from the disparity values for the plurality of features of interest based on locations of the other pixels relative to the features of interest, wherein the disparity value for the display element is generated from the disparity values for the features of interest and the other pixels in the display element.

24. The host device of claim 17, wherein the host device is configured to reduce the number of different disparity values present in the plurality of disparity values to produce a reduced set of different disparity values by:

determining different disparity values in the plurality of disparity values;

determining a frequency of occurrence of each of the different disparity values in the plurality of disparity values, and including in the reduced set of different disparity values a number, but not all, of the most frequently occurring different disparity values.

25. The host device of claim 17, wherein the host device is configured to reduce the number of different disparity values present in the plurality of disparity values to produce a reduced set of different disparity values by:

determining different disparity values in the plurality of disparity values;

determining a frequency of occurrence of each of the different disparity values in the plurality of disparity values, and including in the reduced set of different disparity values a number, but not all, of the different disparity values occurring at spaced apart frequencies, optionally wherein the spaced apart frequencies are spaced more closely at higher frequencies that at lower frequencies of occurrence of the different disparity values.

26. The host device of claim 17, wherein the host device is configured to reduce the number of different disparity values present in the plurality of disparity values to produce a reduced set of different disparity values by:
   determining different disparity values in the plurality of disparity values;
   quantising each of the different disparity values by an amount sufficient to reduce the number of different disparity values; and
   including in the reduced set of different disparity values the quantised different disparity values.

27. The host device of claim 17, wherein the host device is configured to reduce the number of different disparity values present in the plurality of disparity values to produce a reduced set of different disparity values by:
   predetermining different disparity values based on knowledge of numbers of different disparity values used in historical reduced sets of different disparity values; and
   including in the reduced set of different disparity values the predetermined different disparity values.

28. The host device of claim 17, wherein the host device is configured to reduce the number of different disparity values present in the plurality of disparity values to produce a reduced set of different disparity values by:
   predetermining different disparity values based on historical pluralities of disparity values from preceding stereoscopic pairs of images, the predetermined different disparity values being less than an average number of different disparity values in the historical pluralities of disparity values; and
   including in the reduced set of different disparity values the predetermined different disparity values.

29. The host device of claim 17, wherein the compressed data further comprises correction information, optionally wherein the correction information comprises a correction to the particular disparity value associated with a particular one of the locations and/or displaced locations, and optionally wherein the correction information comprises correction information for regenerating the regenerated second image of the stereoscopic pair of images if particular disparity values associated with two or more particular locations and/or displaced locations result in the display elements at those particular locations in the regenerated second image overlapping or having gaps therebetween.

30. The system of claim 18, wherein the display control device is configured to regenerate the stereoscopic pair of images from the received compressed data by:
   regenerating a regenerated first image of the regenerated stereoscopic pair of images corresponding to the first image using the first image of the stereoscopic pair of images from the compressed data; and
   regenerating the regenerated second image of the regenerated stereoscopic pair of images corresponding to the second image using the first image of the stereoscopic pair of images from the compressed data, the reduced set of different disparity values, and the information indicating particular disparity values associated with each of the locations and/or displaced locations.

31. The system of claim 30, wherein either:
a) each disparity value is associated with a location in the first image and regenerating the regenerated second image comprises:
   based on the location of each display element in the first image, determining a corresponding location of a corresponding display element in the regenerated first image; and
   copying each of the corresponding display elements of the regenerated first image into a displaced location in the regenerated second image based on the particular disparity value associated with the location in the first image; or
b) each disparity value is associated with a displaced location in the second image and regenerating the regenerated second image comprises:
   for each displaced location in the regenerated second image, determining a location in the regenerated first image based on the disparity value associated with the displaced location in the second image; and
   copying a portion of the regenerated first image at the location in the regenerated first image into the displaced location in the regenerated second image, the portion corresponding to a display element.

* * * * *